(12) United States Patent
Reiter et al.

(10) Patent No.: US 7,911,895 B2
(45) Date of Patent: Mar. 22, 2011

(54) METHOD FOR RESTORING DATA STORED ON AN OPTICAL DISC AND OPTICAL DISC DRIVE SUITABLE THEREFORE

(75) Inventors: Gottfried Reiter, Adnet (AT); Josef Schuller, Salzburg (AT); Hans-Peter Niederberger, Unken (AT)

(73) Assignee: SONY DADC Austria AG, Anif (AT)

( * ) Notice: Subject to any disclaimer, the term of this patent is extended or adjusted under 35 U.S.C. 154(b) by 991 days.

(21) Appl. No.: 11/680,220

(22) Filed: Feb. 28, 2007

(65) Prior Publication Data

US 2007/0242375 A1 Oct. 18, 2007

(30) Foreign Application Priority Data

Mar. 31, 2006 (EP) .................................... 06006853

(51) Int. Cl.
*G11B 15/52* (2006.01)
(52) U.S. Cl. .................... 369/47.14; 369/53.15
(58) Field of Classification Search .......... None
See application file for complete search history.

(56) References Cited

U.S. PATENT DOCUMENTS

| | | | |
|---|---|---|---|
| 4,508,450 A | 4/1985 | Ohshima et al. | |
| 4,963,901 A | 10/1990 | Wilkinson et al. | |
| 6,144,632 A * | 11/2000 | Burroughs | 720/719 |
| 6,261,159 B1 | 7/2001 | Krieg et al. | |
| 6,386,946 B1 | 5/2002 | Lin et al. | |
| 6,442,117 B1 | 8/2002 | Saiki et al. | |
| 7,106,679 B2 * | 9/2006 | Sasaki et al. | 369/53.35 |
| 7,266,069 B2 * | 9/2007 | Chu | 369/53.35 |
| 7,586,595 B2 * | 9/2009 | Okamoto | 356/237.2 |
| 2001/0054208 A1 | 12/2001 | Ichimura et al. | |
| 2002/0001266 A1 * | 1/2002 | Tateishi et al. | 369/47.26 |
| 2002/0168927 A1 | 11/2002 | Bauer | |

(Continued)

FOREIGN PATENT DOCUMENTS

CA 2272980 4/2000

(Continued)

OTHER PUBLICATIONS

Young Jae Huh, et al., "Deformation Effects and Recording Characteristics of Compact Disc-Recordables", XP-002401605, Japanese Journal of Applied Physics, Regular Papers & Short Notes & Review Papers; Optical Memories, vol. 36, Part 1, No. 1B, Jan. 1997, pp. 403-409.

(Continued)

*Primary Examiner* — Paul Huber
(74) *Attorney, Agent, or Firm* — Oblon, Spivak, McClelland, Maier & Neustadt, L.L.P.

(57) ABSTRACT

The current invention is directed to a method and optical storage media reading device for restoring data stored along a data storage path of an optical storage media, the data being stored on the optical storage media and being at least in part unreadable by a conventional optical storage media reading device due to chemical or physical changes within a recording layer or a reflective layer of the optical storage media. The method and device includes detecting deformations of a shape of a groove and lands of the groove extending along the data storage path, the deformations having been generated by a laser beam during a recording process of the optical storage media, and determining the data to be restored from the detected deformations and lands.

21 Claims, 7 Drawing Sheets

U.S. PATENT DOCUMENTS

2004/0233805 A1* 11/2004 Yoshida et al. ............ 369/47.14
2006/0203700 A1* 9/2006 Selinfreund et al. ....... 369/275.1

FOREIGN PATENT DOCUMENTS

NL 1009185 11/1999

OTHER PUBLICATIONS

Y. J. Huh, et al., "Thermal Decomposition and Deformation of Dye and Polycarbonate in Compact Disc-Recordables", XP009073175, Japanese Journal of Applied Physics, Regular Papers & Short Notes & Review Papers, vol. 36, Part 1, No. 12A, Dec. 1997, pp. 7233-7238.

P. K. Tan, et al., "Substrate Deformation Studies on Direct Overwriting of Phase-Change Rewritable Optical Disc with Germanium Nitride Interface Layers", XP-002401746, Japanese Journal of Applied Physics, Regular Papers, Short Notes & Review Papers, The Japan Society of Applied Physics, vol. 43, No. 7B, 2004, pp. 5024-5028.

* cited by examiner

Fig. 11

METHOD FOR RESTORING DATA STORED ON AN OPTICAL DISC AND OPTICAL DISC DRIVE SUITABLE THEREFORE

TECHNICAL FIELD

The invention relates to a method for restoring data stored along a data storage path of an optical storage media, said data being stored on said optical storage media and being at least in part unreadable by a conventional optical storage media reading device. Further, the present invention relates to optical storage media reading device for restoring data stored along a data storage path of an optical storage media, said data being stored on said optical storage media and being at least in part unreadable by a conventional optical storage media reading device

BACKGROUND

During the last decades, optical discs have become an important data storage medium. Optical discs can be classified into different categories: read-only discs, write-once discs and re-writable discs. The read-only discs only allow to read data stored on the discs, whereas the write-once discs additionally allow to record data. While the data recorded onto write-once discs cannot be deleted in order to record new data, re-writable discs have the possibility to do so.

Figure 1:
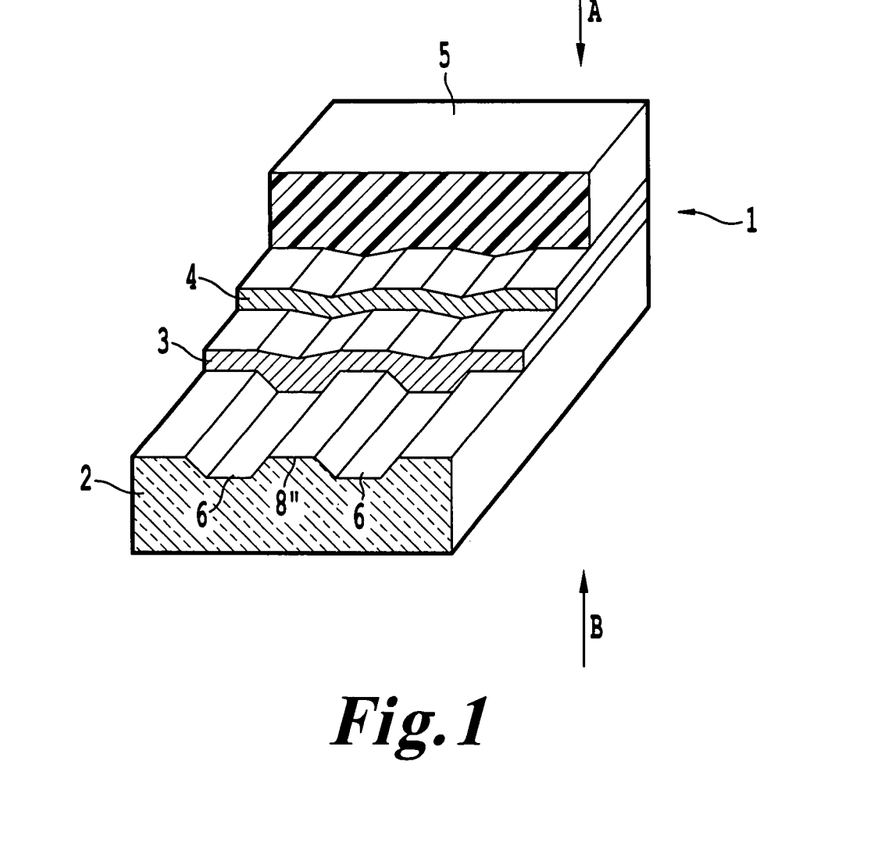
FIG. 1 shows a schematic drawing of the arrangement of a conventional write-once disc.
Figure 2A:
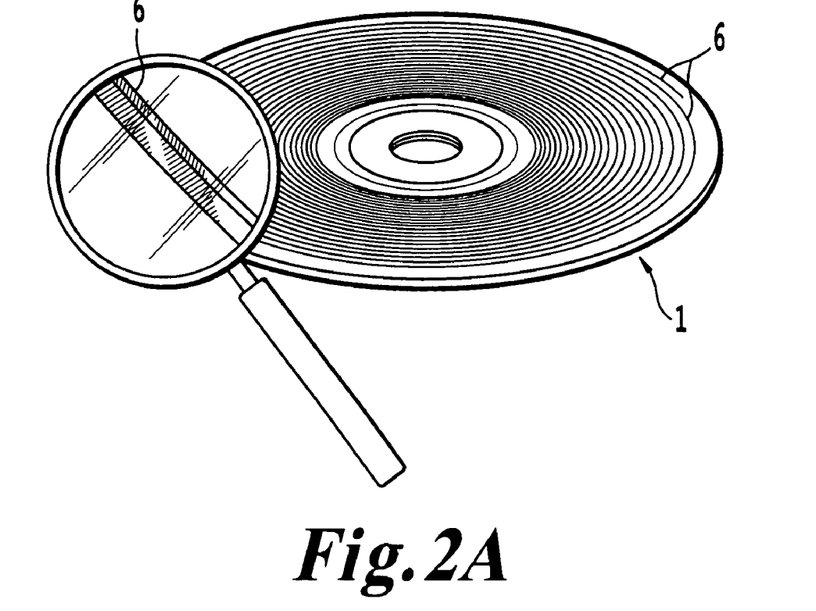
FIG. 2 shows a schematical drawing illustrating further aspects of the write-once disc shown in FIG. 1.
Figure 2B:
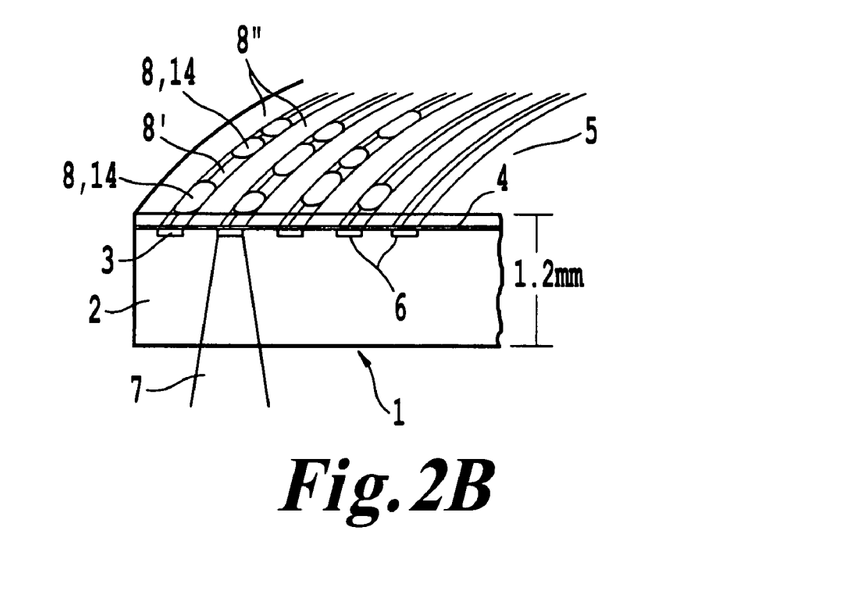

FIG. 1 shows the arrangement of a known write-once (in the following also referred to as "recordable optical disc") disc 1 exemplified by a CD-R disc. The disc 1 comprises a transparent substrate (for example polycarbonate) layer 2, a recording layer 3, a reflective layer 4 and a protective layer 5. The substrate layer 2 is provided with grooves 6 which are extending along the spiral shaped data storage path which is shown in FIG. 2.

In order to record information onto the disc 1, a recording laser beam 7 irradiates the recording layer 3 through the substrate layer 2, thereby forming "pits" 8 (writing marks), i.e. areas of the recording layer 3 showing a different reflection behavior than the rest of the recording layer 3 positioned within/above the grooves 6. The length of the pits 8 and the distance between the pits (in the following referred to as lands) along the groove which is extending along the spiral shaped data storage path represents a sequence of binary "0"-values and "1"-values which itself represent the data stored on the disc 1.

Figure 3:
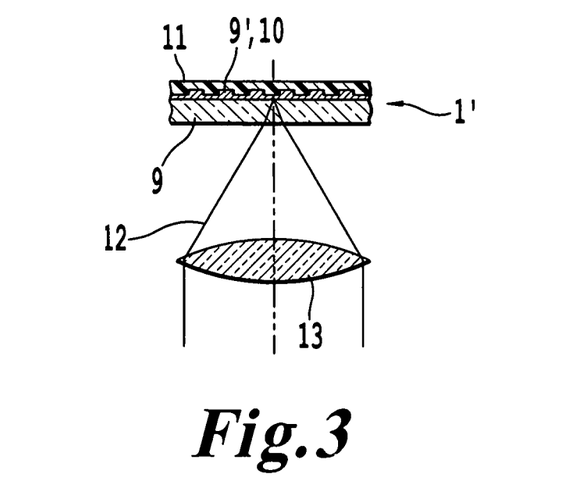
FIG. 3 shows a schematical drawing of a read-out process of a conventional read-only disc.

FIG. 3 shows the arrangement of a known read-only disc 1'. The disc 1' comprises a transparent substrate layer 9, a reflective layer 10 and a protective layer 11. The read-only disc 1' contains a spiral shaped data storage path of successive shallow depressions 8, also called pits, which are 'pressed' into the substrate layer 9 by a stamper during a replication process forming an information layer 9'. This information layer 9' is coated by a reflective layer 10. Encoded information is stored in the length of the pits 8 and in the distances between the pits (in the following also referred to as lands 8'). During playback of the read-only disc 1' a scanning-like spot 12 which is focused by an objective lens 13 is diffracted by the pits 11 in the information layer 9'. Additionally there is some destructive interference between the laser light reflected from the pits and the laser light reflected from the area around the pits. The laser light that is reflected and diffracted back into the objective lens 13 is modulated according to the information encoded within the information layer 9'. The intensity of the laser light that is reflected and diffracted back into the objective lens 13 is converted into an electrical signal also called high frequency (HF) signal. This HF-signal is pre-amplified, filtered, equalized and converted into a digital signal (in case of a compact disc this signal is called EFM-signal) by an auto-slicer which extracts the positions of the crossings of the HF-signal with a decision level. The resulting digital signal is then decoded, error-corrected and fed into the further signal processing units. The read out process of the write-once disc 1 is performed in a similar way.

A problem which may occur over a period of time, e.g. years, is that the chemical composition or the physical properties of the recording layer 3 or of the reflective layer 4 of the disc 1 may change in a way that information stored within the recording layer 3 may no longer be read out. For example, in case of a recordable layer based on an organic dye layer the chemical composition of the recording layer 3 may change such that the refractive index of the recording layer at the location of the pits 8 coincides with or is close to the refractive index of the rest of the recording layer, thereby making it impossible to read the information originally stored onto the disc 1. In a similar way, problems may occur if the reflective layer 10 of the read-only disc 1' shown in FIG. 3 or the reflective layer 4 of the write-once disc 1 shown in FIG. 1 deteriorates. In this case, information originally stored on the read-only disc 1' or on the write-once disc 1 will no longer be readable.

It is an objective of the present invention to provide a method for restoring data stored on optical discs if a normal read out of said data is no longer possible due to deterioration effects as described above.

SUMMARY OF THE INVENTION

In order to solve this objective, the present invention provides methods for restoring data according to claims 1 and 2. Further, the present invention provides optical disc drives for restoring data according to claims 20 and 21. Preferred embodiments of the present invention are defined in dependent claims.

The present invention provides a method for restoring data stored along a data storage path, of an optical storage media, said data being stored on said optical storage media and being at least in part unreadable by a conventional optical storage media reading device, e.g. conventional optical disc drive, due to, in particular undesired, chemical or physical changes within a recording layer of the optical storage media, comprising the following steps:
  detecting deformations and/or lands of a groove extending along the data storage path, the deformations having been generated by a laser beam during a recording process of said optical storage media,
  determining the data to be restored from the detected deformations and/or lands.

It should be noted, that it may be sufficient to detect only pits. However, in general the length of the pits and the length of the lands is detected.

In an embodiment, said optical storage media may be a disc shaped optical storage media or optical disc. Said optical storage media may also be of another format/form like e.g. business card shaped media based on the CD or DVD format (molded into its shape or shaped by mechanical methods) or other 'shaped CDs or DVDs' in the form of many different designs like fruits, Christmas trees, hearts or the like.

In an embodiment, said data storage path may be a spiral path, as e.g. on a standard optical disc, like a compact disc (CD) or a digital versatile disc (DVD). Said data storage path, however, may also be a straight path, curved path, concentric circular path or a path of another shape. For example concentric circular paths are used at some magneto-optical storage formats. For example straight paths are used at optical memory card formats as laid down in ISO/IEC 11693 and ISO/IEC 11694.

Further, the shape of the deformations to be detected may be extending laterally across the data storage path. More specific, said deformations concern a deformation of the side walls of said groove. The side walls of said grooves are thereby widened, i.e. the distance between the side walls at the top and/or bottom of the groove is larger at the locations of deformations than at other corresponding parts of the groove without deformations. There may also be deformations of the groove top. Groove top in this context means the area of the groove which is directed to the normal read-out side of the optical data storage media.

Part of the invention was to realize that due to the heat produced by a recording laser beam during recording of the pits/writing marks of the optical disc causes deformations of the shape of the groove extending along the data storage path, in particular spiral shaped path, wherein the dimensions of said deformations correspond at least in part to the dimensions of the pits/writing marks generated by the recording laser beam within the recording layer. Further, part of the invention was to realize that said deformations are not subjected to degradation over time, i.e. still exist even after a deterioration of the recording layer has been taken place. As a consequence, data originally stored as pits/writing marks and/or lands within the recording layer can be restored after deterioration of the recording layer by determining the (positions and dimensions of the) deformations of the shape of the groove as described above.

The present invention further provides a method for restoring data stored along a data storage path of a read-only optical storage media, e.g. a read-only disc, said data storage path comprising pits and lands, said data being stored on said optical storage media and being at least in part unreadable by a conventional optical storage media reading device due to, in particular undesired, chemical or physical changes within a reflective layer of the optical storage media, the reflective layer serving for reflecting a read out laser beam, comprising the following steps:
  detecting pits and lands extending along the data storage path, the pits having been generated by a stamper during a replication process, wherein the detection of the pits and lands is based upon the use of a modified optical read out means which is capable of detecting the pits and lands even if the reflective layer of said optical storage media is at least partly damaged or not present,
  determining the data to be restored from the detected pits and lands.

This method can be combined with the method described previously. For example, if an optical disc comprises a first recorded part (comprising pits generated by a stamper during a replication process) and a second recorded part (recorded by a user using a recording laser beam), therewith constituting a so-called hybrid recordable optical disc, the modified or adapted optical read-out means may be arranged such that the deformations of the shape of the groove in the second recorded part and the pits located within the first recorded part can be detected. Since the shape and dimension of the pits and/or lands is not the same as the shape and the dimension of the deformations of the groove the read-out process may be carried out in two different steps.

According to an embodiment of the present invention, a protective layer, and/or a reflective layer and/or a recording layer of the optical disc might be removed before the deformation, pit and/or land detecting step is carried out.

According to an embodiment of the present invention, in order to detect the deformations, pits and/or lands, a scanning process is performed which scans the deformations, pits and/or lands along the data storage path and comprises the following steps:
  irradiating the data storage path using a scanning laser beam,
  converting the intensity of laser light reflected at the data storage path into an electronic read out signal,
  extracting information relating to the deformations and/or pits to be detected out of the read out signal.

In order to improve the read out process described above, the optical disc might be re-coated with a new recording layer and/or with a new reflective layer and/or with other new layers before the scanning process is carried out. The thicknesses of the recording layer and/or reflective layer and/or other layers are advantageously chosen such that the deformations and/or pits along the data storage path can be scanned by the scanning laser beam with improved precision.

The material used for re-coating may depend on the type of optical storage media which needs to be recoated. The material is chosen, such that it enhances the contrast between the deformations/pits and the area around the deformations/pits and to increase the slew-rate of the HF-Signal at the leading and trailing edges of the deformations and/or pits. Slew rate in this context means how fast the HF-signal changes at the leading and trailing edges of the deformations and/or pits and is a measure for the rise time and fall time of the HF-signal. These parameters should not be seen separately but in combination with the other parameters like laser wavelength, reading laser power, numerical aperture, radial and tangential rim intensity.

The material for the new layers could be high refractive index materials like high refractive index polymer, ITO, $Nb_2O_5$, SiN, $Si_3N_4$, $SiO_xN_y$, $Ta_2O_5$, $TiO_2$, $ZrO_2$ or other material showing a refractive index n of more than 1.6, preferably more than 1.9.

The thickness of the material for the new layers depends on the type of optical storage media which needs to be re-coated. The thickness of the "best material" is chosen to enhance the contrast between the deformations/pits and the area around the deformations/pits and to increase the slew-rate of the HF-Signal at the leading and trailing edges of the deformations and/or pits.

In an embodiment, the thickness of the reflective layer can be between 10 and 500 nm, e.g. between 50 and 200 nm. The thickness of the recording layer on the area between the grooves can be between 10 and 500 nm, e.g. between 50 and 200 nm. The thickness of new layers can be between 10 and 500 nm, e.g. between 50 and 200 nm.

Alternatively and/or additionally, the laser wavelength and/or the reading laser power and/or the numerical aperture of the lens and/or the rim intensities of the optical pick-up of the modified read out means is chosen such that the deformations, pits and/or lands can be scanned by the scanning laser beam with improved precision. Rim intensity in this context means the distribution of intensity of an incident laser beam to the focusing lens.

The laser wavelength used by the optical pick-up may be chosen to be higher or lower than the standard laser wavelength according to the specification of the optical disc. The reading laser power used by the optical pick-up may chosen to be higher or lower than the standard laser power according to the specification of the optical disc. The numerical aperture of the lens of optical pick-up may chosen to be larger or smaller than the standard numerical aperture according to the specification of the optical disc.

According to an embodiment of the present invention, the radial or the tangential rim intensity of the optical pick-up may be chosen to be larger or smaller than the standard radial or tangential rim intensity according to the specification of the optical disc.

The laser wavelength, reading laser power, numerical aperture, radial and tangential rim intensity and/or other parameters influencing the detection may be chosen in a way as to enhance the optical contrast between the deformations and/or pits and the area around the deformations and/or pits and to increase the slew-rate of the HF-Signal at the leading and trailing edges of the deformations and/or pits. These parameters must be optimized by considering and combining the characteristics of the new recording layer and/or a new reflective layer and/or other new layers which are mentioned above.

As already mentioned, the scanning laser beam may irradiate the data storage path from either the normal read-out face, also referred to as normal read-out side, or from the opposite face/side of the optical disc. In other words, the data storage path may be irradiated either from the top or bottom face, i.e. from upside down, of the disc.

In order to improve data restoring, the read out signal may be subjected to signal processing.

According to an embodiment of the present invention, the signal processing comprises additional filter processing and/or edge detection processing in order to improve the quality of the deformation and/or pit detection process.

After the additional filter processing and/or edge detection processing an auto-slicer generates a digital signal with leading and trailing edges corresponding to the positions of deformations/pits and the land at a certain decision level of the HF signal.

According to an embodiment of the present invention, in order to determine the data to be restored from the detected deformations, pits and/or lands, a pulse length correction step is performed which assigns at least one or each pulse length of a detected deformation/pit or land (distance between two deformations/pits) to a specific 'standard effect length'. The signal processing may comprise steps to remove and/or correct too short or too long pulse lengths determined.

'Standard effect length' in this context means the defined duration of a specific deformation/pit (e.g. 3T ... 11T pit) and specific land (e.g. 3T ... 11T land), according to the related specification of the optical disc.

'Pulse length' in this context means the duration between the leading and trailing edges corresponding to the length of the deformations/pits and the land (distance between two deformations/pits), measured at a reference scanning velocity measured at the decision level of the HF signal.

According to an embodiment of the present invention, the pulse length correction step, also referred to as assignment step, is based upon statistical signal processing. For example, the assignment step comprises the steps of:
  processing at least a part of the read out signal in order to measure the pulse lengths of several deformations/pits and land,
  calculating a deformation/pit pulse length histogram and a land pulse length histogram from the measured pulse lengths,
  assigning each of the peaks of the measured pulse length histogram to a specific standard effect length (e.g. in case of the 3Tpit signal of a compact disc (CD) the first peak of the histogram resulting from the shortest deformation/pit pulses is assigned to 3Tpit standard effect length),
  calculating the time difference between each of the peaks of the histogram and the corresponding standard effect length (i.e. in case of the 3Tpit signal of a CD the time difference between the first peak resulting from the shortest deformation/pit pulses and the 3Tpit effect length is calculated),
  correcting each signal length belonging to a specific peak by adding or subtracting the corresponding calculated time difference (i.e. in case of the 3Tpit signal of a CD the time difference between the first peak resulting from the shortest deformation/pit pulses and the 3Tpit effect length is subtracted from or added to the actual pulse length).

This method may be modified by calculating modified deformation/pit histograms and modified land histograms from the measured pulse lengths by sorting the individual pulse lengths depending on what type of symbols (for example in case of a CD these are 3TPit to 11TPit, 3TLand to 11TLand symbols) have occurred before and/or after the pulse length measurements and correcting the pulse length based on these modified histograms.

The present invention further provides an optical storage media reading device for restoring data stored along a data storage path of an optical storage media, said data being stored on said optical storage media and being at least in part unreadable by a conventional optical storage media reading device due to chemical changes or physical changes within a recording layer and/or a reflective layer of the optical storage media, comprising:
  optical read out means adapted for irradiating the optical storage media along the data storage path with a read out laser beam and converting the intensity of laser light reflected at the data storage path into a electronic read out signal, wherein said optical read out means is adapted for detecting deformations of a groove extending along the data storage path even if the reflective layer and/or the recording layer of said optical storage media is at least partly damaged or not present, said deformations having been generated by a laser beam during a recording process of said optical storage media,
  extracting means adapted for extracting information out of the read out signal relating to the deformations,
  processing means adapted for processing the extracted information in order to obtain the data to be restored.

Further, the present invention provides an optical storage media reading device for restoring data stored along a data storage path of an optical storage media, said data being stored on said optical storage media and being at least in part unreadable by a conventional optical storage media reading device due to chemical changes or physical changes within a reflective layer of the optical storage media, the reflective layer serving for reflecting a read out laser beam, comprising:
  optical read out means adapted for irradiating the optical storage media along the data storage path with a read out laser beam and converting the intensity of laser light reflected at the data storage path into an electronic read out signal, wherein said optical read out means is adapted for detecting pits and lands of a groove extending along the data storage path even if the reflective layer of said optical storage media is at least partly damaged or not present, said pits and lands having been generated by a stamper during a replication process of said optical storage media,
  extracting means adapted for extracting information out of the read out signal relating to said pits and lands,
  processing means adapted for processing the extracted information in order to obtain the data to be restored.

All embodiments mentioned in conjunction with the methods according to the present invention above can also be applied to the optical disc drives according to the present invention in an analogous manner.

All different aspects of the present invention as set out above and further elucidated below might be combined in any way. The accompanying drawings, which are incorporated in and constitute a part of the specification, illustrate an exemplary embodiment of the invention, and, together with a general description of the invention given above, and the detailed description of the embodiments given below, serve to explain the principle of the invention, wherein:

BEST MODE FOR CARRYING OUT THE INVENTION

Figure 7A:
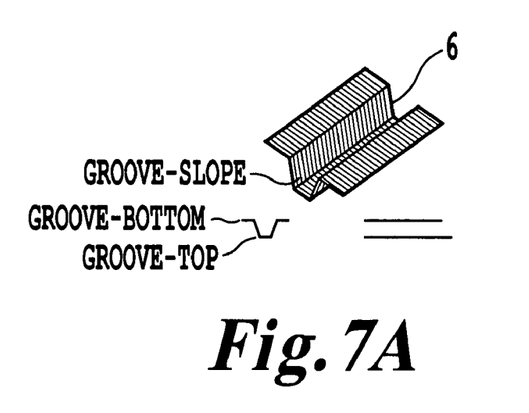
FIG. 7 shows a schematical drawing of deformations within the shape of a groove detected in the method according to the present invention.
Figure 7B:
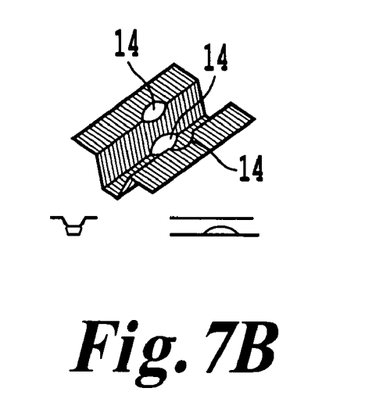

FIG. 7 shows deformations 14 within the shape of grooves 6 which result from a recording process of an optical disc using a recording laser beam. As can be seen in FIG. 7, the groove is deformed at the areas of the pits/writing marks. The groove-top is "elevated" and the groove-slopes are pushed apart.

Figure 4:
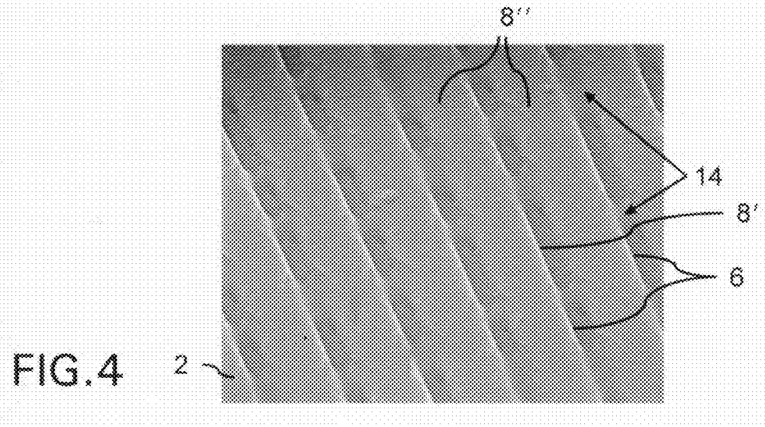
FIG. 4 shows a photograph of the structure of the substrate layer of write-once disc after recording.
Figure 5:
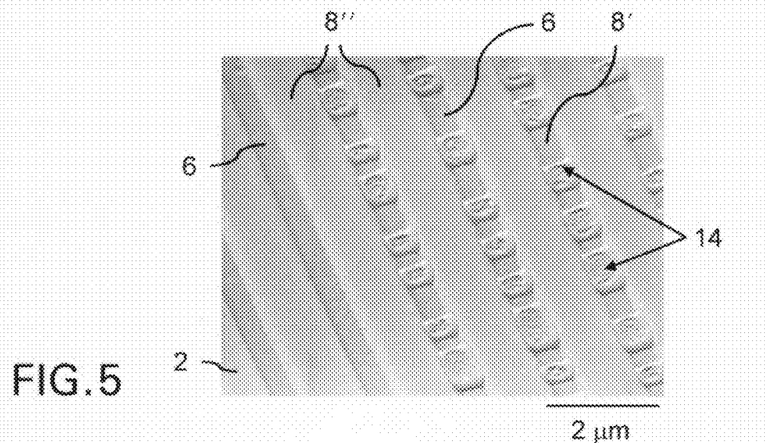
FIG. 5 shows a photograph of the structure of the substrate layer of a write-once disc after recording.
Figure 6:
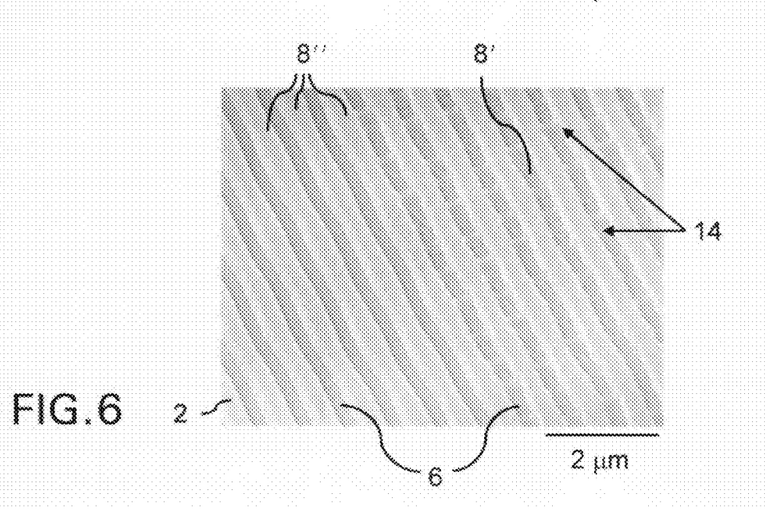
FIG. 6 shows a photograph of the structure of the substrate layer of a write-once disc after recording.

FIGS. 4, 5 and 6 are top views (indicated by arrow A in FIG. 1) of the substrate layer 2 of recordable optical discs after removal of the recording layer 3, the reflective layer 4 and the protective layer 5. FIG. 4 shows a phthalocyanine CD-R disc, whereas FIGS. 5 and 6 show a cyanine CD-R disc and a DVD+R disc, respectively.

In order to detect the deformations 14, it is possible to irradiate the optical disc along a direction indicated by arrow "A" or by a direction (opposite direction, this is the usual direction during standard read-out) indicated by arrow "B" in FIG. 1. Advantage of the first alternative is that the quality of the read-out signal is not disturbed by scratches within the substrate layer 2. However, it might be necessary to remove the recording layer 3, the reflective layer 4 and the protective layer 5 which would not be necessary when choosing the second alternative.

Since the quality and the recording layer 3, the reflective layer 4 and the protective layer 5 may have been deteriorated over a period of time, e.g over years, it may also be possible to remove these layers in a first step and to re-coat the substrate layer 2 with a new recording layer 3, a new reflective layer 4 and a new protective layer 5. In a second step, the deformations 14 can then be read out by irradiating the optical disc along the direction indicated with arrow "B" in FIG. 1. In this case, the thicknesses of the recording layer 3, the reflective layer 4 and the protective layer 5 are advantageously chosen such that the deformations 14 can be read out with improved precision.

Figure 8:
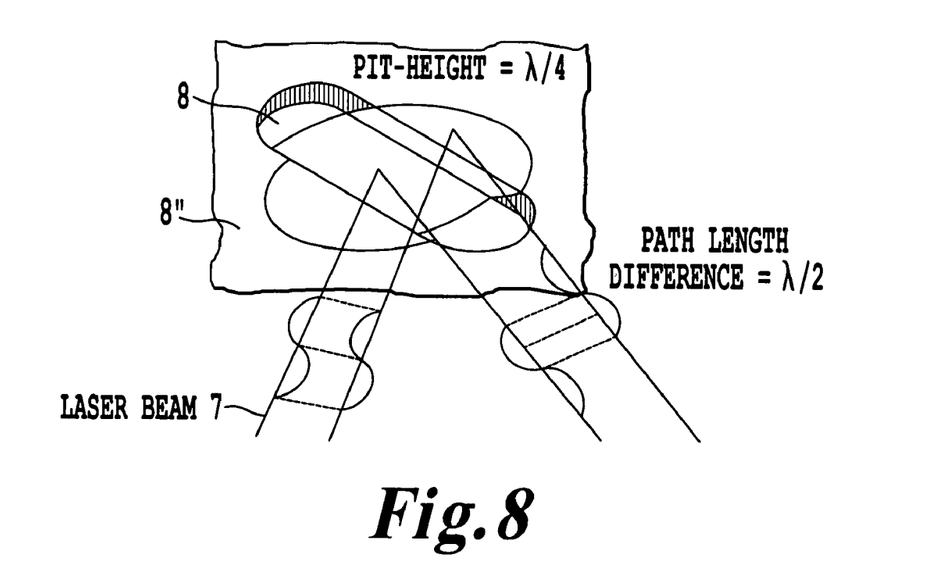
FIG. 8 shows optical principles of a read-out process of a conventional optical disc called destructive interference, FIG. 9 showing schematic drawings illustrating an embodiment 7 of the method according to the present invention, FIG. 10 showing schematic drawings illustrating an embodiment of the method according to the present invention, FIG. 11 showing an exemplary block diagram of an optical disc drive.
Figure 9:
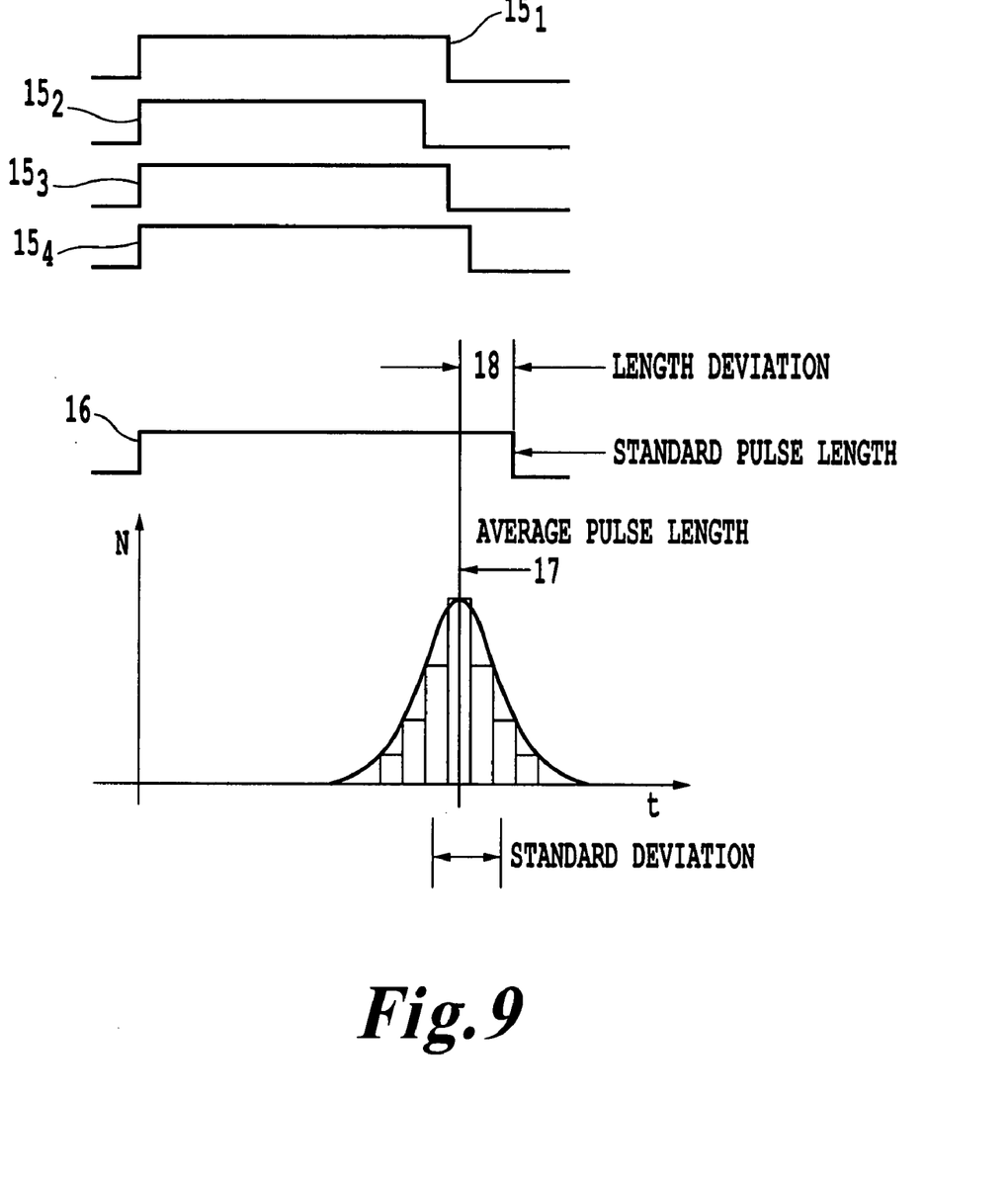

According to an embodiment of the present invention, the read-out process is performed by moving a read-out laser beam 7 along the groove (6) extending along a data storage path (in the same way as a conventional optical disc drive reads out the pits located within/above a data storage path). The properties of the read-out laser beam 7 have to be chosen such that the deformations 14 can be detected as precisely as possible. FIG. 8 shows that, in order to achieve a good read-out signal quality, the wavelength $\lambda$ of the read-out laser beam 7 impinging on a pit 11 of a data storage path 6 should be correlated by the height of the pit 11 by the correlation:pit height=$\lambda/4$, since in this case a phase shift of $\lambda/2$ (light distinction) between light reflected from the pit 11 and light reflected from the area between the pits 11 (land) can be achieved (maximum destructive interference means maximum "contrast" of the read-out signal). This principle can also be applied to the present invention: the wavelength of the read-out laser beam 7 should to be chosen such that the phase shift between light reflected from the deformations 14 and light reflected from the area between the deformation 15 is as close as possible to $\lambda/2$ (requirement for the modified optical read-out means used in conjunction with the method/optical disc drive according to the present invention).

It is possible to extract information from light that has been reflected from a pit 8, land 8' and/or from an area 8" around deformations and pits.

Figure 10A:
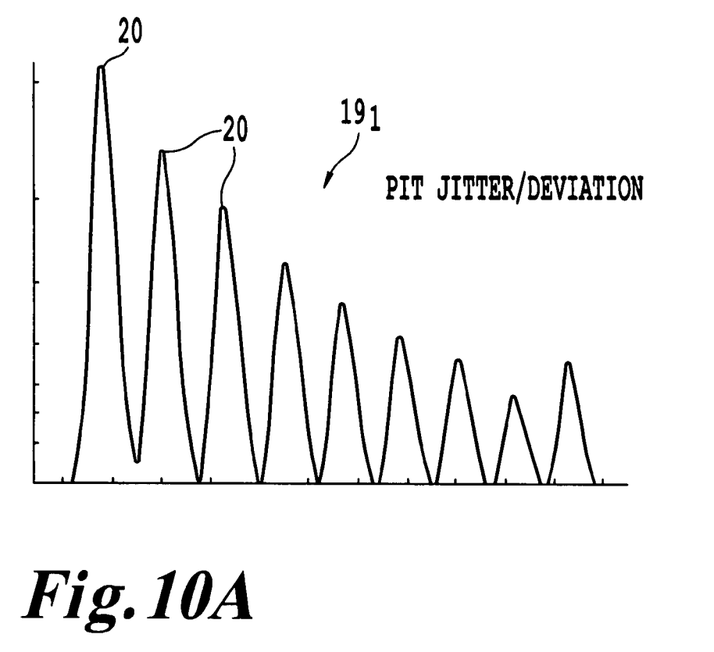
Figure 10B:
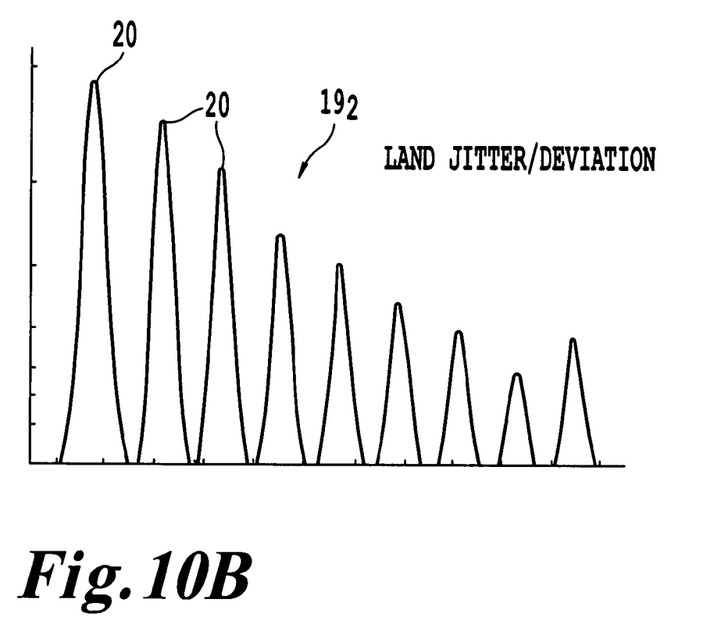

FIG. 10 shows that pulse lengths $15_1$ to $15_4$ corresponding to deformations 14 or pits 11 (obtained when scanning the deformations 14/pits 11, i.e. when processing a corresponding read-out signal) generally do not coincide with a standard effect length 16 prescribed by the specification of the optical disc. Instead, the average pulse length 17 of the pulse lengths $15_1$ to $15_4$ is shifted from the standard pulse length 16 by a time length deviation 18.

According to the standard of optical discs the information is coded in different discrete standard effect lengths e.g. for CD these are 3T to 11T. T is the time base and for CD T is about 231 ns. So theoretically pits and lands have a specific standard effect length. In order to be able to decode the information the average pulse length and the pulse length deviation for pits and lands must be kept within certain limits.

In case of the deformations along the data storage path the average pulse lengths could be different to the average pulse lengths of a prerecorded optical disc because the deformations do not show the same shape and height as normal pits and therefore show a bigger difference to the standard effect length defined in the respective specification of the optical discs. If this difference is bigger than a certain limit, the decoder has trouble distinguishing between the discrete pulse lengths. i.e. the decoder could confuse a T4 with a T5 or T3 effect.

So one possibility is to design a special decoder which considers the different pulse lengths.

Another possibility is to measure the average pulse lengths and compensate (correct) for the difference between the actual pulse lengths and the standard effect lengths specified by the standard of the optical disc.

Such a correction step, also referred to as assignment step, is taken into account by an embodiment of the present invention, in which:

at least a part of the read-out signal is processed in order to measure the pulse lengths 15 of several deformations 14, a deformation pulse length distribution $19_1$ (pit pulse length distribution or pit pulse histogram), $19_2$ (land pulse length distribution or land pulse histogram) is calculated from the measured pulse lengths, each of the peaks 20 of the calculated histogram 19 is assigned to a specific standard effect length, for each standard effect length the time difference between each of the peaks of the histogram 19 and the corresponding standard effect length is calculated, and each pulse length 15 belonging to a specific peak 20 of the histogram 19 is corrected by the adding or subtracting the calculated time difference from the measured pulse length.

In this way, new pulse lengths (adapted to the length of the deformations 14) are defined.

Further aspects of the present invention are as follows:

The lifetime of recordable optical discs is limited. By time the recordable layer (i.e. dye) of the discs is destroyed by UV-light or decomposes for other reasons. The error rate of recorded discs is increasing and the discs may become unreadable.

An "unwanted" effect is that there are small deformations of the guide groove during writing of the "pits". These deformations are permanent. After removal of the recordable layer (i.e. dye), the reflective metal layer and the protective layer it is possible to re-coat the information side of the disc and read-out the original data by use of a special optical disc drive. For easier read-out the disc may be coated again: Although read-out without coating is possible, re-coating of the disc may be done with dye and reflective coating or with reflective coating only. The thickness of the dye in the groove and on the area between the grooves) may be not standard but chosen to optimize the contrast between the deformations/pits and the area around the deformations/pits to improve readability (e.g. to utilize the interference conditions of thin films). Other coatings instead of the normal dyes may be used to improve readability.

Since the deformations do not show the same dimensions (i.e. shape, depth) as normal "pits", it may be helpful to modify the pickup and the electronic circuits of a standard optical disc drive in order to improve readability. Such modifications may include the modification of the focused beam diameter and/or of the focused laser beam shape and/or of the laser wavelength.

Figure 11:
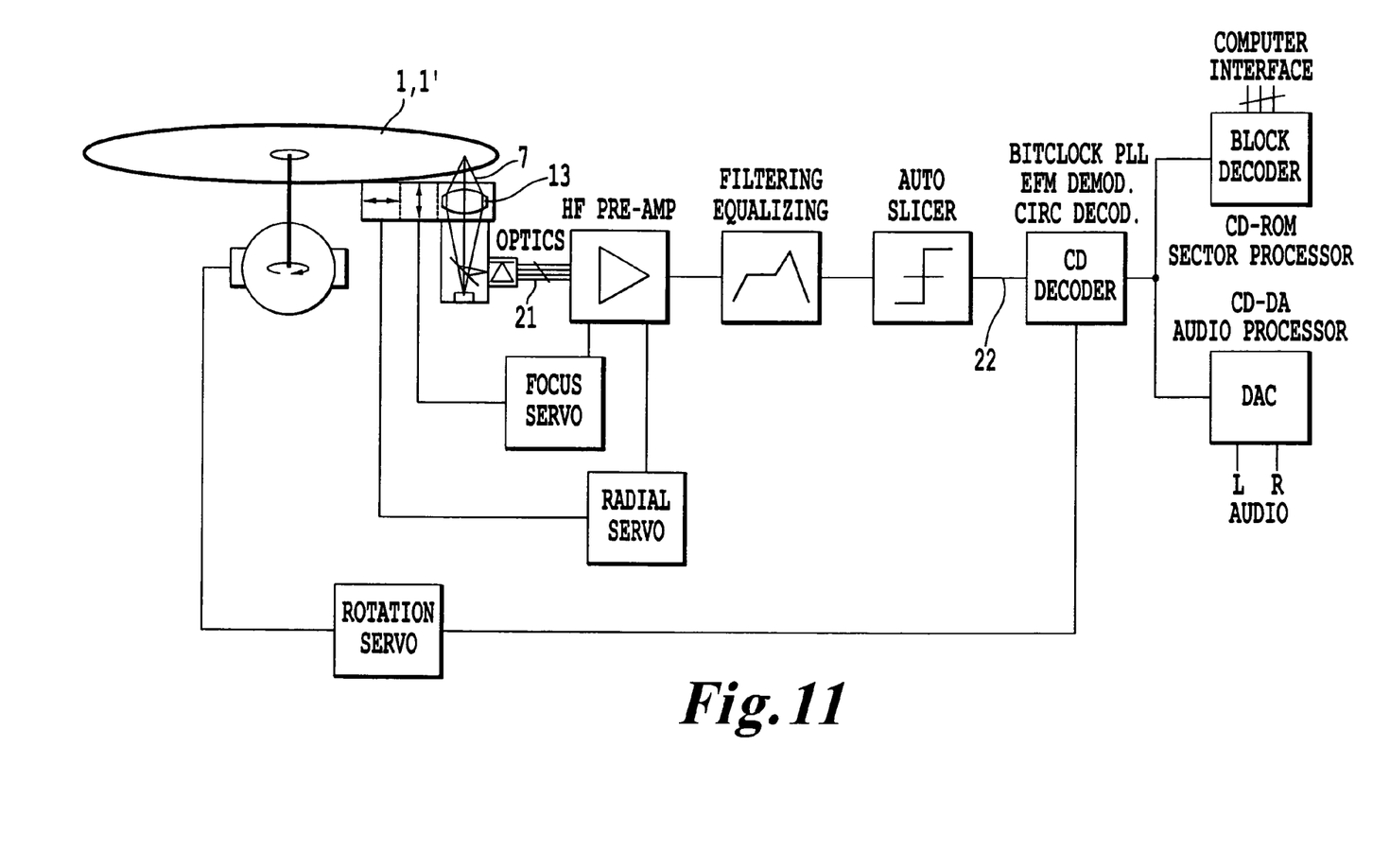

FIG. 11 shows an exemplary block diagram of an optical disc drive, in this case a CD-ROM drive. The intensity of the laser light that is reflected and diffracted back into the objective lens 13 is converted into an electrical signal also called high frequency (HF) signal. This HF-signal is pre-amplified, filtered, equalized and converted into a digital signal by an auto-slicer which extracts the positions of the crossings of the HF-signal with a decision level. The decision level may be defined according to the standard of the related optical disc. For example for a compact disc it is the level in the middle of the extreme values of the I3 signal which I the signal of the shortest pits and lands. The resulting digital signal (in case of a compact disc it is called the EFM-signal) is then decoded, error corrected and fed into the further signal processing units.

Electronic edge detection (e.g. by considering the usual signal slope and usual discrete pulse lengths of the deformations/pits and lands of and optical disc according to the related standard) and additional filtering (i.e. low-pass, high-pass or bandpass filtering) may improve the quality of the read-out signal.

Statistical methods may be applied to improve the restoration quality (e.g. checking for most probable pulse length, eliminating of non-valid pulse length).

By use of a modified pickup it is also possible to read-out the discs from the opposite side (not through the substrate), thus eliminating the influence of the substrate layer (e.g. scratches, skew, uneven thickness, birefringence).

The present invention may be applied to all types of recordable optical discs where there is some deformation of the groove or other similar permanent damage or mechanical modification of the information layer caused during writing as well as to prerecorded optical discs where the information is stored in form of pits (e.g. where the reflective layer is damaged) including e.g. CDs, DVDs and Blu-ray Discs. Today, there are seven primary methods by which information can be recorded on optical media. All methods heat the recording layer to a certain temperature. The methods are known as ablative, alloying, bubble-forming, moth-eye, phase-change, dye/polymer and magneto-optic which cause or could cause some mechanical deformation of the substrate.

The height of the deformations (at the position of pits/writing marks) in the grooves is different for different discs. Sample AFM measurements of the height of these deformations (in reference to the groove-top surface) showed values in the range of 20 to 50 nm but could be higher or smaller.

The protective coating and the reflective layer may be removed by mechanical processes like peeling or by chemical processes. The removal of the dye layer may be performed by use of solvents e.g. IPA (Isopropylacohol), TAA (Titanium Acetyl Acetonate) eventually supported by high pressure cleaning and by ultrasonic cleaning. Then, a drying process may be performed.

Alternatively and/or additionally, the disc may be re-coated after removal with a new dye and/or a new reflective layer and/or a new protective layer. The thickness of the dye in the groove and on the area between the grooves may be not standard but optimized to improve readability (e.g. to utilize the interference conditions of thin films). Re-coating the disc with other dyes or other materials which improve the read-out signal to improve readability (e.g. in order to utilize the interference conditions of thin films) may be advantageous.

Since the deformations do not show the same dimensions as normal "pits", it may be helpful to modify the pickup and the electronic circuits of a standard optical disc drive in order to improve the quality of the read-out signal, thereby obtaining an optical disc drive according to the present invention.

A standard optical disc has a pit-height which is approximately ¼ of the laser's wavelength in the substrate. At this pit-height the destructive interference of the beam reflected from the pit area and the beam reflected from the area around the pit is maximum.

Usually an optical disc is read through the transparent substrate (for example polycarbonate). In case of CD the refractive index of the substrate is specified to be within n=1.45 to 1.65. The laser light used for reading of a compact disc has a wavelength of about 780 nm. In the substrate the wavelength is reduced to about 500 nm, the optimum pit depth for best modulation thus amounts about 125 nm.

But theoretically at a pit-height of $\lambda/4$ the push-pull tracking signal is 0. To obtain a good tracking signal the pit depth is usually in the range between $\lambda/8$ and $3\lambda/8$, preferably in the range between 100 and 150 nm. In case of a higher wavelength e.g. 405 nm the effect of the destructive interference is much smaller but together with other effects it is enough to read-out the signal.

According to the present invention, the modifications of the optical pick-up may include:
- choosing the focused beam diameter to be bigger or smaller in diameter as a "normal" focused beam diameter
- shifting the laser wavelength preferably to a smaller wavelength, e.g. 650 nm or 405 nm to better satisfy the interference conditions of the more shallow deformations (pits/writing marks) resulting from the recording process)
- electronic enhancement of the read-out signal like edge detection (e.g. by considering the usual signal slope and usual discrete pulse length)
- additional electronic filtering
- correction of the average pulse-length of the deformations (pits/writing marks) resulting from the recording process and the lands (distance between two deformations resulting from the recording process) to standard values After an auto-slicer has generated a digital signal with leading and trailing edges corresponding to the positions of deformations/pits and the lands at a certain decision level of the HF signal a process for correcting the average pulse-length of the deformations/pits and lands could be as follows:
- measurement of an average pulse-length for each different effect length resulting from the deformations/pits and lands of the disc (e.g. for a CD these are 3TPit to 11TPit, 3TLand to 11TLand) in form of a pit pulse signal histogram and a land pulse signal histogram
- calculation of the deviation between each of the peaks of the histogram (e.g. for a CD these are 3TPit to 11TPit peaks, 3TLand to 11TLand) and the standard effect length for each discrete deformation/pit length and land length according to the standard of the optical disc
- correction of the each pulse-length of all discrete deformation/pit lengths and land lengths by considering the related deviation value
- further decoding of the signal using a standard decoder or a special decoder.

REFERENCE SYMBOLS 1 write-once disc
1' read-only disc
2 substrate layer
3 recording layer
4 reflective layer
5 protective layer
6 groove
7 reading laser beam
8 pit
8' land
8" area around deformations and pits
9 substrate layer
9' information layer
10 reflective layer
11 protective layer
12 scanning light spot
13 objective lens
14 deformation
$15_1$ to $15_4$ pulse length
16 standard effect length
17 histogram peak—average pulse length
18 time length deviation
19 deformation/pit and land histogram
20 peaks of the histograms
21 HF-signal
22 EFM-signal

The invention claimed is:

1. A method for restoring data stored along a data storage path of an optical storage media, said data being stored on said optical storage media and being at least in part unreadable by a conventional optical storage media reading device due to chemical or physical changes within a recording layer or a reflective layer of the optical storage media, comprising the following steps:
   detecting deformations of a shape of a groove and lands of the groove extending along the data storage path, the deformations having been generated by a laser beam during a recording process of said optical storage media,
   determining the data to be restored from the detected deformations and lands.

2. A method for restoring data stored along a data storage path of an optical storage media, said data storage path comprising pits and lands, said data being stored on said optical storage media and being at least in part unreadable by a conventional optical storage media reading device due to chemical or physical changes within a reflective layer of the optical storage media, the reflective layer serving for reflecting a read out laser beam, comprising the following steps:
   detecting pits and lands extending along the data storage path, the pits and lands being in part unreadable by the conventional optical storage media reading device, and the pits having been generated by a stamper during a replication process, wherein the detection of the pits and lands is based upon the use of a modified optical read out means which is capable of detecting the pits and lands even if the reflective layer of said optical storage media is at least partly damaged or not present,
   determining the data to be restored from the detected pits and lands.

3. The method according to claim 1 or 2, wherein a protective layer and/or a reflective layer and/or a recording layer of the optical storage media is removed before the deformation, pit and/or land detecting step is carried out.

4. The method according to any one of claims 1 or 2, wherein, in order to detect the deformations and/or pits and the lands, a scanning process is performed which scans the deformations and/or the pits and lands along the data storage path and comprises the following steps:
   irradiating the data storage path using a scanning laser beam,
   converting the intensity of laser light reflected at the data storage path into an electronic read out signal,
   extracting information related to the deformations and/or to the pits and lands to be detected out of the read out signal.

5. The method according to claim 4, wherein the optical storage media is re-coated with a new recording layer and/or with a new reflective layer and/or at least one other new layer before the scanning process is carried out.

6. The method according to claim 5, wherein the thicknesses of said new recording layer and/or of said new reflective layer and/or of said other new layer are chosen such that the contrast between the deformations and/or pits and the area around the deformations and/or the pits is enhanced and/or the slew-rate of the HF-Signal at the leading and trailing edges of the deformations and/or pits is increased so that the deformations and/or the pits and lands along the data storage path can be scanned by the scanning laser beam with improved precision.

7. The method according to claim 5, wherein the laser wavelength (λ) and/or the reading laser power and/or the numerical aperture of the lens and/or the rim intensities of the optical pick-up of the modified read out means is chosen such that the contrast between the deformations and/or pits and the area around the deformations and/or the pits is enhanced and/or the slew-rate of the HF-Signal at the leading and trailing edges of the deformations and/or pits is increased so that that the deformations and/or the pits and lands and/or the area around pits and lands can be scanned by the scanning laser beam with improved precision.

8. The method according to claim 7, wherein the laser wavelength (λ) used by the optical pick-up is higher or lower than the standard laser wavelength according to the specification of the optical storage media.

9. The method according to claim 7, wherein the reading laser power used by the optical pick-up is higher or lower than the standard laser power according to the specification for normal data read-out from the optical storage media.

10. The method according to claim 7, wherein the numerical aperture of the lens of optical pick-up is larger or smaller than the standard numerical aperture according to the specification of the optical storage media.

11. The method according to claim 7, wherein the radial and/or the tangential rim intensity of the optical pick-up is larger or smaller than the standard radial or tangential rim intensity according to the specification for normal data read-out from the optical storage media.

12. The method according to claim 4, wherein the scanning laser beam irradiates the data storage path from the normal read-out face or from the opposite face of the optical storage media.

13. The method according to claim 5, wherein the read out signal is subjected to signal processing.

14. The method according to claim 13, wherein the signal processing comprises additional filter processing and/or edge detection processing in order to improve the quality of the deformation detecting step and/or pit detecting step and land detecting step.

15. The method according to claim 14, wherein, in order to determine the data to be restored from the detected deformations and/or from the detected pits and lands an assignment step is performed, which assigns each detected deformation and/or pit and land to a specific standard effect length.

16. The method according to claim 15, wherein the signal processing comprises steps to remove and/or correct pulse lengths which are shorter than a first predetermined value and longer than a second predetermined value resulting from the detected deformations and/or from the detected pits and lands after an auto-slicer has generated a digital signal with leading and trailing edges corresponding to the positions of the detected deformations and/or of the detected pits and the lands at a certain decision level of the high frequency (HF) signal.

17. The method according to claim 15, wherein the assignment step is based upon statistical signal processing.

18. The method according to claim 17, wherein the assignment step comprises the steps of:
processing at least a part of the read out signal in order to measure the pulse lengths of several deformations and/or of several pits and lands,
calculating a deformation/pit histogram and a land histogram from the measured pulse lengths,
assigning each of the peaks of the calculated histograms to a specific effect length,
calculating the time difference between each of the peaks of the histograms and the corresponding standard effect length,
correcting each pulse length belonging to a specific peak of the histograms by subtracting or adding the corresponding calculated time difference.

19. The method according to claim 17, wherein the assignment step comprises the steps of:
processing at least a part of the read out signal in order to measure the pulse lengths of several deformations and/or of several pits and lands,
calculating modified deformation/pit histograms and modified land histograms from the measured pulse lengths by sorting the pulse length measurements depending on what type of symbols have occurred before and/or after the pulse length measurements
assigning each of the peaks of the modified histograms to a specific effect length,
calculating the time difference between each of the peaks of the modified histograms and the corresponding standard effect length,
correcting the pulse length belonging to a specific peak of the modified histograms by subtracting or adding the corresponding calculated time difference based on these modified histograms.

20. Optical storage media reading device for restoring data stored along a data storage path of an optical storage media, said data being stored on said optical storage media and being at least in part unreadable by a conventional optical storage media reading device due to chemical changes or physical changes within a recording layer and/or a reflective layer of the optical storage media, comprising:
optical read out means adapted for irradiating the optical storage media along the data storage path with a read out laser beam and converting the intensity of laser light reflected at the data storage path into a electronic read out signal, wherein said optical read out means is adapted for detecting deformations of a shape of a groove extending along the data storage path even if the reflective layer and/or the recording layer of said optical storage media is at least partly damaged or not present, said deformations having been generated by a laser beam during a recording process of said optical storage media,
extracting means adapted for extracting information out of the read out signal relating to the deformations and lands,
processing means adapted for processing the extracted information in order to obtain the data to be restored.

21. Optical storage media reading device for restoring data stored along a data storage path of an optical storage media, said data being stored on said optical storage media and being at least in part unreadable by a conventional optical storage media reading device due to chemical changes or physical changes within a reflective layer of the optical storage media, the reflective layer serving for reflecting a read out laser beam, comprising:
optical read out means adapted for irradiating the optical storage media along the data storage path with a read out laser beam and converting the intensity of laser light reflected at the data storage path into an electronic read out signal, wherein said optical read out means is adapted for detecting pits and lands extending along the data storage path, the pits and lands being in part unreadable by the conventional optical storage media reading device, and pits and lands having been generated by a stamper during a replication process even if the reflective layer of said optical storage media is at least partly damaged or not present, extracting means adapted for extracting information out of the read out signal relating to said pits and lands, processing means adapted for processing the extracted information in order to obtain the data to be restored.

* * * * *